O. LUGO.
APPARATUS FOR DISTILLING SPIRITUOUS LIQUIDS.
No. 73,539.　　　　　　　　　Patented Jan. 21, 1868.
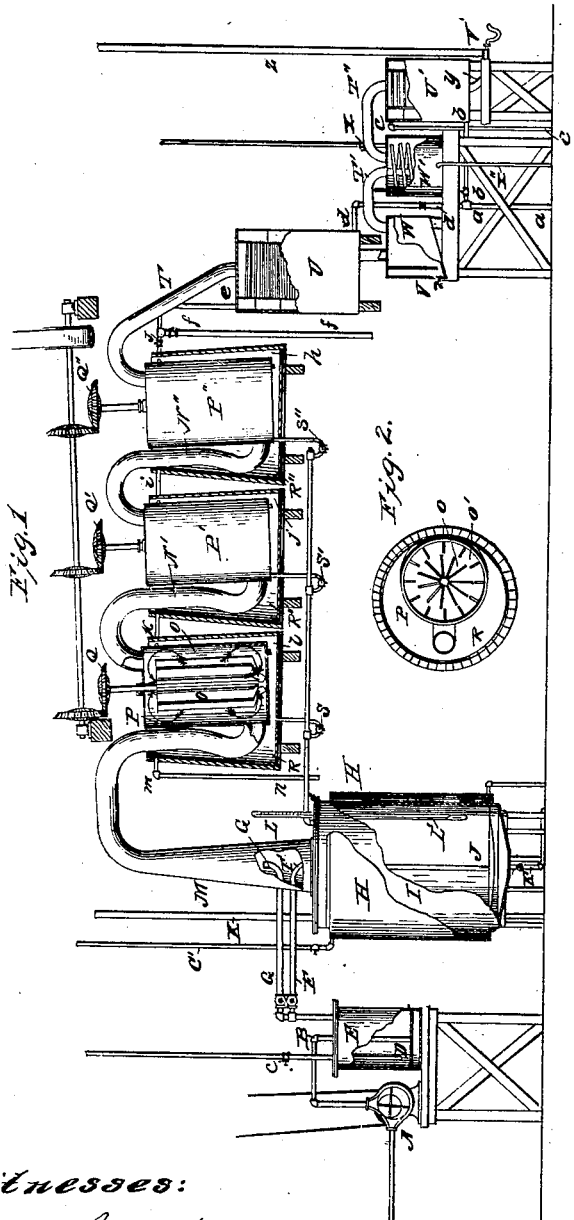

United States Patent Office.

ORAZIO LUGO, OF NEW YORK, N. Y., ASSIGNOR TO JOHN F. COLLINS, OF SAME PLACE.

*Letters Patent No. 73,539, dated January 21, 1868.*

IMPROVED APPARATUS FOR DISTILLING SPIRITUOUS LIQUIDS.

*The Schedule referred to in these Letters Patent and making part of the same.*

Be it known that I, ORAZIO LUGO, of the city, county, and State of New York, have invented a new and improved Apparatus for Distilling Spirituous Liquids; and that the following is a full and exact description thereof, reference being had to the accompanying drawings, and to the letters of reference marked thereon.

The nature of my invention consists, first, in an apparatus for the production of a superior class of spirits, by means of a current of alkalizated or alkalinetted air introduced into the distilling-apparatus while the process of distillation is going on; second, in having between the still and the condenser a column provided with receivers or analyzers, with enclosed rotating and stationary fans; and third, in having attached to an alcohol-still an apparatus for collecting and producing ethers.

To enable others skilled in the art to make and use my invention, I will proceed to describe its construction and operation.

Figure 1 is a longitudinal section of my distilling-apparatus.

Figure 2 is a horizontal section of one of the receivers, P.

Similar letters of reference indicate corresponding parts.

A, air-pump; B, air-pipe; C C', steam-pipe; D, perforated bottom; E, iron vessel; F F' G G', air-pipes; K, feeding-pipe; K', discharge-pipe; H, steam-jacket; I, still; J, perforated bottom, connected with the air-pipe F; L L', thermometer; M, goose-neck; N N' N'', connecting-pipes; O, rotary fans; O', stationary fans; P P' P'' cylindrical receivers or analyzers; Q Q' Q'', geared wheels, to communicate motion to the fans O; R R' R'', water-tanks; S S' S'', traps, stop-cocks, and returning-pipe; T, pipe leading to the condenser U; V, stop-cock, where the finished spirit is received; W, receiving-box; W', leaden still; T', goose-neck; V', trap; Z, escape-pipe; X X' X'', steam-pipe and worm; $a\ b\ c\ d\ e\ f\ g\ h\ i\ j\ l\ m\ n$, water-pipes.

The operation is as follows: The still I is filled to about three-fourths of its capacity, and steam is admitted into the steam-jacket H by means of the steam-pipe C', the vessel E having been filled about half full with a strong solution of caustic soda or caustic potassa, or their equivalents, which is heated by means of the steam-pipe C. The water stop-cock at $d$ is opened, and the condenser U and the tanks R R' R'' filled with water. The condenser U' is also filled with water, and the leaden still W filled about half full with sulphuric or other desired acid, and a little heat applied through the steam-pipe X. As soon as the thermometer L indicates a temperature of about 190° Fahrenheit, the air-pump A is set in motion. The stop-cock at F is set full open, and that at G about one-fourth open. At the same time, the fans O are set in motion, and the distillation proceeded with. The alcohol is received at the stop-cock V, of any desired strength and purity, by simply opening or closing the water-cock at $d$.

Experiments have shown me that when I blow air through a strong solution of a caustic alkali, the air and vapors come off charged with alkali, (test, red litmus-paper turns blue,) and when I introduce the vapors so charged into the distilling-apparatus, I obtain spirits perfectly neutral, and free from fusel oils, acids, or ethers.

The function of the rotating and stationary fans O' O' is to throw all the vapors against the inside surfaces of the receivers or analyzers P, this form having proved a valuable appliance for improving the quality of the distillates, besides being very effective as analyzers. When the current of air passes at T, it is still charged with alcoholic vapors, and in order to collect them, I pass the said current of air through an acid in the still, W', and thus change the alcoholic vapors into ether, collecting the same at V'.

What I claim as my invention, and desire to secure by Letters Patent, is—

1. Introducing into a distilling-apparatus a current of alkalinetted air, substantially in the manner described and set forth.

2. One or more receivers or analyzers between the still and condenser, having enclosed rotating and stationary fans, for the purpose described and set forth.

3. Producing, in connection with, or continuation of, the process of distilling alcohol, ethers during the same operation, substantially as described and set forth.

ORAZIO LUGO.

Witnesses:
L. A. SEDGWICK,
E. L. COLLINS.